United States Patent
Prasad (10) Patent No.: US 6,381,216 B1
(45) Date of Patent: Apr. 30, 2002

(54) SIMPLIFIED SWITCH ALGORITHM FOR FLOW CONTROL OF AVAILABLE BIT RATE ATM COMMUNICATIONS

(75) Inventor: Sharat Prasad, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/179,183

(22) Filed: Oct. 27, 1998

Related U.S. Application Data (60) Provisional application No. 60/063,660, filed on Oct. 28, 1997.

(51) Int. Cl.[7] .............................................. H04L 12/56
(52) U.S. Cl. ...................... 370/236.1; 370/229; 370/468
(58) Field of Search ......................... 370/229, 231–233, 370/236, 236.1, 389, 395.1, 395.7, 395.43

(56) References Cited

PUBLICATIONS

"The Rate–Based Flow Control Framework for the Available Bit Rate ATM Service", Bonomi et. al., *IEEE Network*, Mar./Apr. '95, pp. 25–39.

"Time Scale Analysis and Scalability Issues for Explicit RateAllocation in ATM Networks", Charny et al., *IEEE ACM Transactions On Networking*, vol. 4, No. 4, 08/96, pp. 569–581.

"Traffic Management Specification Version 4.0", af–tm–0056.000, The ATM Forum Technical Committee, 04/96, pp. ii–iv, pp. 7–10, pp. 38–48, pp. 62–67, pp. 92–97.

"Output–Buffer Switch Architecture for Asynchronous Transfer Mode", Suzuki et al., International Conference on Communications, 06/11–14/89, pp. 0099–0103.

"Phantom: A Siimple and Effective Flow Control Scheme", Afek, et al., *Proc. SIGCOMM '96*, 08/96, pp. 169–182.

"Max–Min Rate Control Algorithm for Available Bit Rate Service in ATM Networks", Muddu et al., Proc. GLOBECOM '9, 11/96.

"A New Rate–Based Switch Algorithm for ABR Traffic to Achieve Max–Min Fairness with Analytical Approximation and Delay Adjustment", Tsang, et al., Infocom '96, *IEEE*, 03/96, pp. 1174–1181.

"Congestion Control Algorithms for the ABR Service in ATM Networks", Bianchi, et al., proc. Globecom '96, 11/96, pp. 1080–1084.

"Dynamic Rate–Based Control Algorithm for ABR Service in ATM Networks", Ghani, et al., Proc. Globecom '96, 11/96, pp. 1074–1079.

"Feedback Control of Multiloop ABR Traffic In Presence Of CBR/ABR Traffic Transmission", Zhao, et al., Proc. ICC '96, 06/96, pp. 1717–1721.

"Introduction to Sonet ATM", Texas Instruments Incorporated, pp. 1–3–1–14.

"LAN Emulation Over ATM Version 1.0", af–lane–0021.000, The ATM Forum Technical Committee, 01/95, pp. 1–34.

*Primary Examiner*—David R. Vincent
*Assistant Examiner*—Van Nguyen
(74) *Attorney, Agent, or Firm*—J. Dennis Moore; W. James Brady, III; Frederick J. Telecky, Jr.

(57) ABSTRACT

An Asynchronous Transfer Mode (ATM) switch (8) and method of operating the same to allocate Available Bit Rate (ABR) communications therethrough is disclosed. The switch (8) receives resource management (RM) cells over a sequence of measurement periods. Within each measurement period, the message flow associated with a received RM cell is identified, and a flag ($SEEN_1$) in a memory array (22) is interrogated to determine whether an RM cell for the message flow has yet been received in the measurement period. If not, a sum value (SUM) is updated with the current cell rate (CCR) of the flow and, if the CCR of the flow is equal to or greater than the highest cell rate ($r_1$) yet measured in the measurement period, a highest cell rate field ($r_1$) in memory and a count ($m_1$) of flows having the highest cell rate are updated. Upon completion of the measurement period, a bottleneck rate is calculated by the switch (8) as the larger of the ratio of ABR bandwidth to ABR flows, or the largest cell rate ($r_1$) plus the surplus bandwidth; the surplus bandwidth is determined by subtracting the cell rate sum (SUM) from the ABR bandwidth, and dividing by the number ($m_1$) of flows having the highest cell rate. The bottleneck rate is then sent to the ATM sources by backward-traveling RM cells, for adjustment of the ABR traffic.

11 Claims, 3 Drawing Sheets

SIMPLIFIED SWITCH ALGORITHM FOR FLOW CONTROL OF AVAILABLE BIT RATE ATM COMMUNICATIONS

CROSS-REFERENCE TO RELATED APPLICATIONS

This application claims the benefit, under 35 U.S.C. §119(e)(1), of U.S. Provisional Application No. 60/063,660, filed Oct. 28, 1997, which is incorporated herein by this reference.

STATEMENT REGARDING FEDERALLY SPONSORED RESEARCH OR DEVELOPMENT

Not applicable

BACKGROUND OF THE INVENTION

This invention is in the field of telecommunications, and is more specifically directed to flow control in asynchronous transfer mode (ATM) communications.

In the field of digital communications, whether applied to voice, video, or data communication, various techniques have been developed for routing messages among nodes connected in a network. One such approach is referred to as packet-based data communications, in which certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information that can be communicated between concentrators (i.e., between the store and forward nodes), and is typically a portion of a message or file. Each packet includes header information relating to the source network address and destination network address, which permits proper routing of the message packet. Packet switching with short length packets ensures that routing paths are not unduly dominated by long individual messages, and thus reduces transmission delay in the store-and-forward nodes. Packet-based data communications technology has enabled communications to be carried out at high data rates, up to and exceeding hundreds of megabits per second.

A well-known example of a fast packet switching protocol, which combines the efficiency of packet switching with the predictability of circuit switching, is Asynchronous Transfer Mode (generally referred to as "ATM"), in which packet lengths and organization are fixed, regardless of message length or data type (i.e., voice, data, or video). The fixed packets according to the ATM protocol are referred to as "cells", and each ATM cell is composed of fifty-three bytes, five of which are dedicated to the header and the remaining forty-eight of which serve as the payload. According to this protocol, larger packets are made up of a number of fixed-length ATM cells. The fixed-size cell format enables ATM cell switching to be implemented in hardware, as opposed to software, resulting in transmission speeds in the gigabits-per-second range. In addition, the switching of cells rather than packets permits scalable user access to the network, from a few Mbps to several Gbps, as appropriate to the application. The asynchronous nature of the transmission permits ATM cells to be used in transmitting delay-tolerant data traffic intermixed with time-sensitive traffic like voice and video over the same backbone facility. To more efficiently utilize the bandwidth for these various applications, traffic management techniques are now employed which give priority to time-sensitive traffic relative to delay-tolerant traffic.

Closed loop traffic management involves the use of feedback signals between two network nodes to govern the data rates of channels, with a goal of improving the efficiency of bandwidth utilization. This efficiency improvement is particularly necessary when communication of compressed voice and video information is involved, because compression tends to make the bit rate variable, in which case the feedback signals enable the network to communicate either the availability of bandwidth or the presence of congestion.

Current traffic management schemes utilize various transmission categories to assign bandwidth in ATM communications. One high priority category is Constant Bit Rate (CBR), in which the transmission is carried out at a constant rate. Two categories of Variable Bit Rate (VBR) transmission are also provided, one for real-time information and another for non-real-time information. A low priority category is Unspecified Bit Rate (UBR), in which data are transmitted by the source with no guarantee of transmission speed. In the recently-developed Available Bit Rate (ABR) service class, feedback from the network nodes, via Resource Management (RM) cells or by way of explicit congestion indications in data cells, is used by the source network node to dynamically control channel transmission rate in response to current network conditions, and within certain transmission parameters that are specified upon opening of the transmission channel (i.e., in the traffic "contract").

For the ABR class of service, the source and destination nodes agree, in the traffic contract, upon a Peak Cell Rate (PCR) and a Minimum Cell Rate (MCR), thus setting the upper and lower bounds of transmission for an ABR communication. Once these bounds are established, a flow control algorithm is executed, typically both at the source network node and at ATM switches in the network, to define the current transmission rate of each channel. As is known in the art, thousands of connections may be simultaneously open between a given pair of network nodes. As such, traffic management can be a relatively complex operation, especially in controlling ABR category communications.

The setting of upper and lower bounds for ABR traffic is only one issue in ATM flow control. Another issue addressed by ATM flow control schemes, referred to in the art as "fairness", is the allocation of available bandwidth among the multiple ABR channels that are to be carried by a given link, especially in the case where the available bandwidth is less than the PCR of each of the channels. A proper fairness scheme requires that ABR channels with the highest PCR (or MCR) do not dominate the available bandwidth, and also that the channels with the lowest PCR (or MCR) are not disproportionately served relative to the high data rate channels.

Several fairness criteria are known in the field of ATM flow control. One fairness criterion, referred to as the "Max-Min" scheme, is popular as it leads to the maximization of total throughput. This approach is based upon an iterative procedure of computing the cell rate allocation among ABR channels. In a first iteration (l=1) of the procedure, a set variable $u_1$ defines the set of links making up the network, and a set variable $v_1$ defines the set of ABR flows traversing the network. Variable $b_j$ is initialized to the bandwidth available to a link $L_j$ in the network, and variable $n_j$ is initialized to the number of ABR flows sharing link $L_j$. During each iteration l, a ratio $r_l$ is determined as the smallest ratio $b_j/n_j$ for all links $L_j \epsilon u_l$. A set of links $W_l=\{L_j\}\subseteq u_l$ is then defined as those links for which the ratio $b_j/n_j$ equals $r_l$, as is a set of flows $S_l=\{F_i\}\subseteq v_l$ where each flow $F_i$ in the set $S_l$ travels over one of the links in $W_l$. The set $W_l$ establishes the level l bottleneck links, and the set $S_l$ establishes the level l bottleneck flows. The data rate $r_l$ is the bottleneck rate of the links in set $W_l$ and is the constraint rate of the flows in set $S_l$. A reduced network $u_{l+1}$ is then constructed by subtracting the bottleneck set $W_l$ from the set $u_l$; set $v_{l+1}$ is then derived, by subtracting set $S_l$ from $v_l$, and defines the set of flows for which constraint rates remain to be determined. Considering m as the number of flows that are both in $S_l$ and which also travel over any link $L_j \subseteq u_{l+1}$, the construction of the reduced network is completed by subtracting the value $mr_l$ from $b_j$, and the number m from $n_j$ for each link $L_j \epsilon u_{l+1}$. If the set $u_{l+1}$ is null, the bottleneck rate of each link and the constraint rate of each flow has been found.

While this approach readily defines the bottleneck and constraint rates, this procedure cannot be directly implemented into ATM network switches because global knowledge of the entire network is required; rather, a practical ATM switch algorithm must permit the links in the network to determine their bottleneck rates in a distributed fashion. A known distributed approach for an individual link $L_j$ of ABR bandwidth $R_j$, shared by $N_j$ ABR flows, begins by dividing the flows $N_j$ into two subsets: subset $C_j$ containing those flows constrained by another link $L_{x\neq j}$ in the network, and subset $B_j$ of the flows for which link $L_j$ is the bottleneck link. Link $L_j$ is, of course, a bottleneck link at some level k, such that subset $C_j$ contains flows that are constrained at links of bottleneck level 1 through k-1 inclusive. Considering each flow $F_i$ in this subset $C_j$ as having a constraint rate $r_i$, link $L_j$ can then determine the set $C_j$ and the constraint rates $r_i$ of its members $F_i$, and derive its own bottleneck rate $BR_j$ as follows:

$$BR_j = \frac{R_j - \sum_{i \in C_j} r_i}{|B_j|} \quad (1)$$

According to this arrangement, each link $L_j$ assigns each of the flows in its subset $C_j$ the constraint rates assigned by the other constraining links in the network, and then equally divides the remaining bandwidth among the flows in its subset $B_j$, effectively assigning the bottleneck rate $BR_j$ thereto.

This approach is distributed, in the sense that each link can derive its own bottleneck rate. However, the time complexity of this algorithm is on the order of the square of the number of flows (i.e., $O(N^2)$) which, for large networks, can be quite substantial; the scaling of the network to accommodate more flows is rendered quite costly, given this dependence. Additionally, the memory needs for this approach are also quite substantial, as the ATM switches must maintain the constraint rate for each flow. As such, conventional approaches for simplifying the algorithm both in computational complexity and memory efficiency have been derived.

Charny, et al., "Time Scale Analysis and Scalability Issues for Explicit Rate Allocation in ATM Networks", *IEEE/ACM Trans. on Networking* (August 1996), pp. 569–581 describes one such simplified distributed algorithm, primarily for determining the subset $C_j$ of flows that are constrained elsewhere from link $L_j$, by noting that any flow with a constraint rate $r_l$ less than the bottleneck rate $BR_j$ of link $L_j$ is clearly constrained at a link other than $L_j$. This approach may be understood by considering a hypothetical sequence of k constraint rates $r_l$, each occurring once in the sequence and arranged in descending order, and each having a tag $m_l$ identifying the number of flows having constraint rate $r_l$. One may consider the inequality:

$$r_{l^*-1} \geq \frac{R - \sum_{l=l^*}^{k} m_l r_l}{N - \sum_{l=l^*}^{k} m_l} > r_{l^*} \quad (2)$$

where N is the total number of ABR flows (i.e., the sum of $m_l$ from l=1 to k) and where R is the total ABR bandwidth. The middle term of inequality (2) thus corresponds to the ratio of the remaining bandwidth of the link (total bandwidth R less the bandwidth occupied by flows constrained elsewhere; i.e., less the flows with lower constraint rates $r_l$, or higher index values as the sequence is arranged in descending order), to the number of remaining ABR flows (total number of flows less the number of flows having higher index constraint rates). According to this simplified distributed approach, inequality (2) is evaluated iteratively in order to find rate $r_l$, which is the smallest $r_l$ for which inequality (2) is satisfied. If inequality (2) is satisfied for some $l=l^* \geq 2$, then the link is oversubscribed, and the oversubscribed bottleneck rate $BR_O$ is given by:

$$BR_O = \frac{R - \sum_{l=l^*}^{k} m_l r_l}{N - \sum_{l=l^*}^{k} m_l} \quad (3)$$

On the other hand, if inequality (2) is not satisfied even for $l^*=2$, the link is under-subscribed, in that sufficient ABR bandwidth is available in the link for all ABR flows. This under-subscribed condition may be represented by:

$$r_1 < \frac{R - \sum_{l=2}^{k} m_l r_l}{N - \sum_{l=2}^{k} m_l} = \frac{R - \sum_{l=2}^{k} m_l r_l}{m_1} \Rightarrow \sum_{l=1}^{k} m_l r_l < R \quad (4)$$

In this case, maximization of data rate requires each of the flows passing through his link to be allowed to increase their data rate. According to the conventional distributed algorithm approach, a value for the bottleneck rate BR must be determined that allows the flows to cumulatively increase their rates by amounts that add up to precisely the difference $$R - \sum_{l=1}^{k} m_l r_l,$$

which is the amount of under-subscription. As described in the above-cited Charny et al. article, l' is the index such that all flows having a rate $r_l<r_l'$ are constrained at another link in the network; only flows that have rates $r_l>r_l'$ may thus increase their rates. The bottleneck rate $BR_U$ for the under-subscribed case is thus determined from equating the amount of under-subscription to the net proposed increase in data rate:

$$R - \sum_{l=1}^{k} m_l r_l = \sum_{l=1}^{l'-1} (BR_U - r_l) m_l = BR_U \sum_{l=1}^{l'-1} m_l - \sum_{l=1}^{l'-1} m_l r_l \quad (5)$$

which, in solving for the under-subscribed bottleneck rate $BR_U$, returns:

$$BR_U = \frac{R - \sum_{l=1}^{k} m_l r_l + \sum_{l=1}^{l'-1} m_l r_l}{\sum_{l=1}^{l'-1} m_l} = \frac{R - \sum_{l=l'}^{k} m_l r_l}{N - \sum_{l=l'}^{k} m_l} \quad (6)$$

Analysis of expression (6) indicates that smaller values of l' provide larger values of under-subscribed bottleneck rate $BR_U$; in the trivial case, where l'=1, $BR_U=\infty$. In closed-loop ATM flow control and traffic management, the under-subscribed bottleneck rate $BR_U$ corresponds to the explicit rate (ER) feedback sent to each source, to serve as an upper bound on the Allowed Cell Rate (ACR) for these channels in the absence of the true constraint rate. Accordingly, this conventional distributed algorithm selects the largest admissible value for $BR_U$, which is given by equation (6) for the case of l'=2:

$$BR_U = r_1 + \frac{R - \sum_{l=1}^{k} m_l r_l}{m_1} \quad (7)$$

This procedure, according to the conventional distributed algorithm, is useful in ATM flow control implemented according to the Max-Min fair rate allocation type of traffic management. However, it has been observed, in connection with the present invention, that each ATM switch must maintain a full sequence of flow rates, covering all flows communicated through each link. This requirement, of course, requires a large amount of high-speed memory, and involves computational complexity (i.e., processing time) of on the order of N, the total number of flows (i.e., O(N)). Computation of the bottleneck rate of a link itself also requires processing time of O(N), in the worst-case, considering that elements in the sequence of flow rates carried by a link are examined sequentially to determine when inequality (2) is satisfied.

By way of further background, another class of fairness algorithms rely upon approximations to reduce computation time and memory requirements relative to the Min-Max approach, such as described according to the foregoing example. However, these approximating approaches have been observed, in some network configurations, to converge to unfair rate allocations. Other algorithms are known that employ encoded representations of the flow rates, to reduce memory requirements, but these encoded approaches are of course subject to errors resulting from coding inaccuracy.

Furthermore, all approaches that periodically recompute flow rate allocations are subject to problems of improper selection of the recomputation period, similarly as any closed loop feedback control scheme. On one hand, the algorithm is less responsive as the recomputation period is too long, while on the other hand, short recomputation periods can lead to measurement errors and unstable control.

Common to all conventional ABR flow control schemes is the problem of congestion as CBR and VBR connections, as well as additional ABR connections, are added to the network, especially after a period of low bandwidth usage. If the network does not reduce the flow rates of the ABR rates quickly enough, congestion resulting in cell loss can occur. Conversely, low link utilization can result if an upstream ATM switch in the network does not promptly "invite" ABR sources to increase flow rates as bandwidth becomes available. In addition, all switch algorithms should be capable of handling growth in switch queues during transient events; conventional techniques for accomplishing this function includes such operations as requiring source stations to delay rate increases but immediately effect rate decreases, or simply by setting-aside link bandwidth to handle transients; these operations, of course, all reduce link utilization.

BRIEF SUMMARY OF THE INVENTION

It is therefore an object of the present invention to provide an ATM switch, and a method of performing flow control at the same, that implements fairness in ABR rate allocation in a computationally efficient manner.

It is a further object of the present invention to provide such a switch and method with reduced memory requirements.

It is a further object of the present invention to provide such a switch and method that is not subject to coding or approximation errors.

It is a further object of the present invention to provide such a switch and method for which scaling of the number of links, including ABR links, may be readily implemented.

Other objects and advantages of the present invention will be apparent to those of ordinary skill in the art having reference to the following specification together with its drawings.

The present invention may be implemented in an ATM switch and method of operating the same, to determine the bottleneck rate of each link handled by the switch as the maximum of two arguments: one argument is simply the ratio of the overall ABR bandwidth of the link divided by the number of ABR flows to be communicated by the link, while the other argument corresponds to the highest ABR flow rate plus (or minus) the surplus (or undersupply) bandwidth divided equally among the flows with the highest ABR rate. This bottleneck rate will converge to the exact Max-Min fair rates, over a few measurement intervals. According to the present invention, only the aggregate rate of all flows, the total number of flows, the largest rate, and the number of flows having the largest rate, need be maintained, and may be computed incrementally over a measurement interval, upon one or more flows being new or modified, as indicated by a flag in a memory array corresponding to the flows. According to a preferred embodiment of the invention, two memory arrays are provided for these flags, to permit one array to be used while the other is being updated.

DETAILED DESCRIPTION OF THE INVENTION

As will become apparent from the following description, the present invention is particularly suited for efficiently and fairly allocating available bandwidth, in a communications network, among channels having the Available Bit Rate (ABR) service according to the Asynchronous Transfer Mode (ATM) communications protocol. As such, the following description will be primarily directed to an example of an ATM communication network arranged and operating according to the present invention. It is contemplated, however, that other communications protocols may equivalently benefit from the present invention, as will be apparent to those of ordinary skill in the art having reference to this specification.

Figure 1:
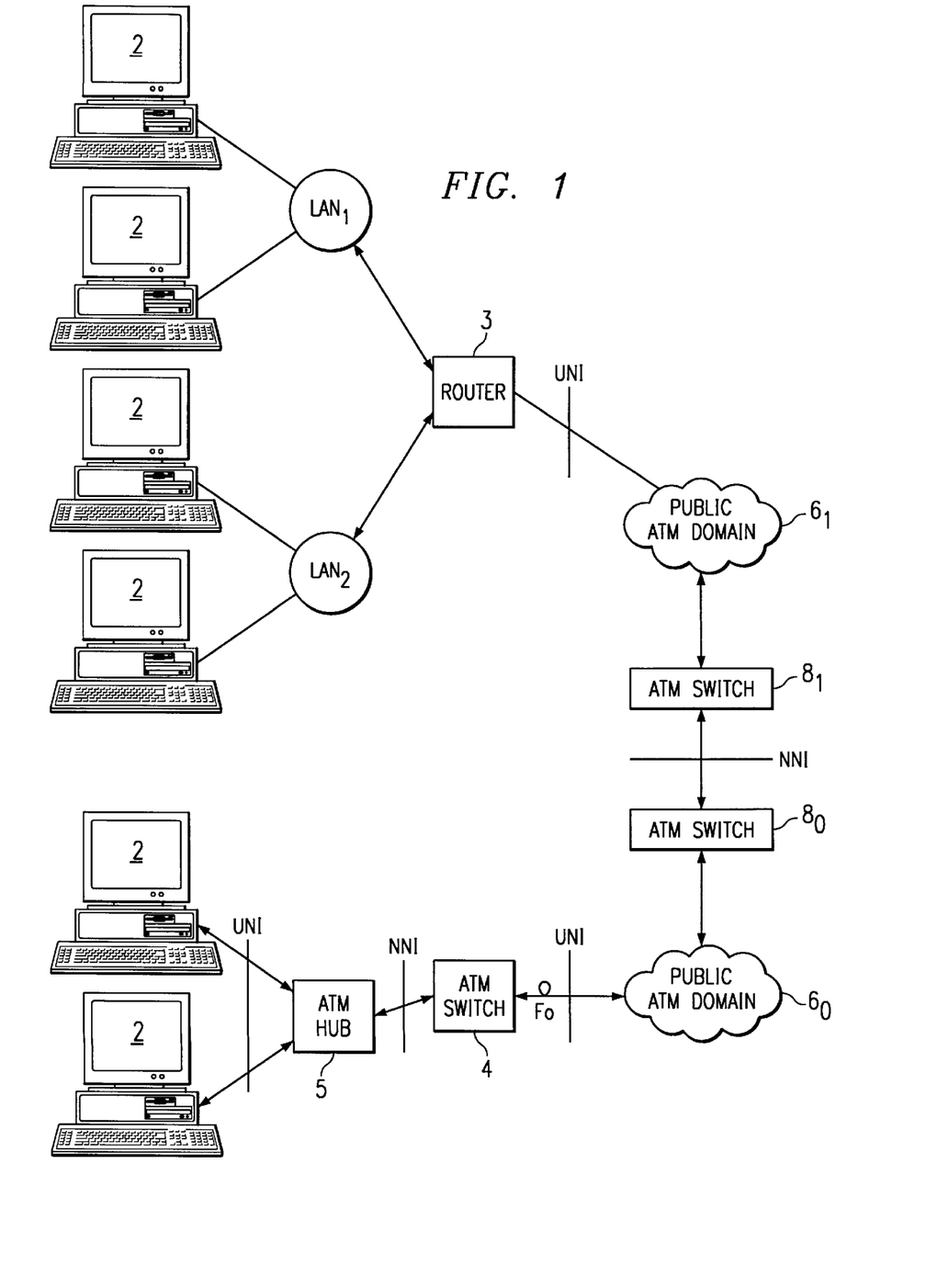
FIG. 1 is an electrical diagram, in block form, of a communications system incorporating the preferred embodiment of the present invention.

FIG. 1 illustrates an example of a large data communications network within which the preferred embodiment of the invention is implemented, operating according to the well-known Asynchronous Transfer Mode (ATM) protocol. In this example, various user workstations 2 are deployed in the network, at locations that not only vary in a logical fashion (i.e., are deployed at various logical locations, or addresses, in the network) but which may also be deployed at widely varying, worldwide, physical locations. These exemplary workstations 2 illustrate that ATM communications ultimately occurs between individual human users, and may include computer readable data, video bitstreams, and data for audio playback.

ATM hub 5 is interfaced with two workstations 2 in the example of FIG. 1. Workstations 2 in this example are arranged in a "pure" ATM network (in which desktop workstations include ATM adapters), an emulated LAN (in which the ATM network supports an existing LAN), or a LAN of the Ethernet type, such that each workstation 2 is in communication with ATM hub 5; of course, workstations 2 may alternatively be arranged in a token-ring LAN or other LAN type. An example of a conventional pure ATM network is described in *Introduction to SONET ATM* (Texas Instruments Inc., 1996), and an example of an emulated LAN is described in *LAN Emulation Over ATM Specification*, Version 1.0 (The ATM Forum, January 1995). ATM hub 5 includes the necessary functionality for recognizing those communications from one of workstations 2 that are intended to be communicated over the network of FIG. 1 to a remote destination, and for forwarding these communications to ATM switch 4. In an ATM-to-desktop arrangement, the interface between workstations 2 and ATM hub 5 is of the User-to-Network Interface (UNI) type, and the interface between ATM hub 5 and ATM switch 4 is of the Network-to-Node Interface (NNI) type. In an Ethernet/ATM hub, the interface between workstation 2 and ATM hub 5 is Ethernet and the interface between ATM hub 5 and ATM switch 4 is of UNI type.

ATM switch 4 is a conventional switching device, for communicating ATM protocol communications between ATM hub 5 and the public ATM network, indicated by public ATM domain $6_0$. ATM switch 4 includes circuitry for performing those traffic management tasks required by the appropriate ATM specifications, such as *Traffic Management Specification*, Version 4.0 (The ATM Forum, April 1996). Additionally, ATM switch 4 includes such formatting circuitry as useful for applying signals to and receiving signals from the particular facility over which communications with public ATM domain $6_0$ is to take place; in this example, fiber optic facility Fo connects ATM switch 4 to public ATM domain $6_0$. In this regard, operations such as policing and, if required by public ATM domain $6_0$, traffic shaping, may be performed by ATM switch 4.

As is known in the art, the public ATM communications network includes various "domains" 6, such as those that may be maintained by various Internet backbone providers and the like. For example, public ATM domains $6_0$, $6_1$ in the network of FIG. 1 may be maintained by different long distance providers, each of which may set requirements upon the traffic that is being transmitted to it not only from its own interfaces, but also from other domains 6. As such, in the example of FIG. 1, switches $8_0$, $8_1$ are provided between public ATM domains $6_0$, $6_1$, such that an NNI-type interface is present thereat. Traffic management functions are generally required, if not merely desired, to be performed by ATM switches $8_0$, $8_1$, particularly in effecting the Available Bit Rate (ABR) class of service.

In the example of FIG. 1, router 3 is illustrated as interfacing with public ATM domain $6_1$ by way of a UNI-type interface. As is known in the art, routers such as router 3 interface multiple local-area networks (LANs). In this case, router 3 interfaces local-area networks $LAN_1$, $LAN_2$ with one another, each of which have multiple workstations 2 thereupon. In this example, local-area networks $LAN_1$, $LAN_2$ are of the token-ring type, but of course may alternatively be of an Ethernet type. Router 3 thus serves to effect communication among workstations 2 on local-area networks $LAN_1$, $LAN_2$ with one another, and to effect communication between workstations 2 on local-area networks $LAN_1$, $LAN_2$ and public ATM domain $6_1$ (and beyond).

Of course, while FIG. 1 illustrates public ATM domain $6_0$ as coupled to ATM switch 4 and ATM hub 5, and public ATM domain $6_1$ as coupled to local-area networks $LAN_1$, $LAN_2$ via router 3, each of public ATM domains $6_0$, $6_1$ will be in communication with many various facilities, including routers, ATM switches, ATM hubs, and the like. The arrangement of FIG. 1 is provided herein simply by way of example.

As noted above, flow control is carried out within the network of FIG. 1 in order to implement the ABR class of service. Fundamentally, ABR service is effected by the ABR traffic sources adjusting their data rates to current and changing network conditions. Information about the current state of the network, including bandwidth availability, network congestion, and the like, is communicated from network elements in the network, particularly by switches 8, to the ABR sources by way of resource management (RM) cells in the ATM packets. Current ATM specifications regarding ABR traffic management and flow control are set forth in *Traffic Management Specification, Version 4.0* (The ATM Forum, April 1996), particularly in sections 2.4 and 5.10. As stated therein, switches 8 in a network over which ABR traffic is supported must perform certain functions, including control of congestion (by rate marking, EFCI marking, etc.), generation of backward RM-cells to produce feedback to the source, and control of rate levels of each of the flows passing through the particular switch 8.

Figure 2:
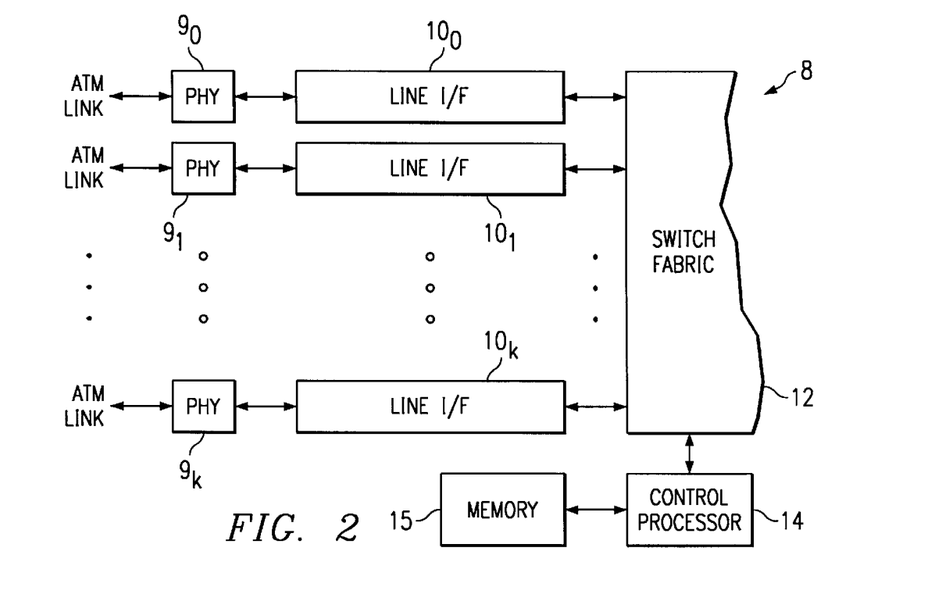
FIG. 2 is an electrical diagram, in block form, of an ATM switch incorporating the preferred embodiment of the present invention.

FIG. 2 illustrates, in block diagram form, an example of one of ATM switches 8 into which the preferred embodiment of the invention may be implemented. As is well-known in the art, many different architectures are available for use in connection with the ATM switching function, in combination with performing traffic management, flow control, and other control functions as desired to maintain a high-performance high-reliability communications network. It is contemplated that the present invention will provide benefit in the traffic management operations carried out by ATM switches of any architecture, as the present invention facilitates high data rate utilization of all links handled by switch 8, while fairly allocating the available bandwidth among all of the ABR channels using the switch. Examples of architecture types that may utilize the present invention include conventional processor-memory based approaches that receive all ATM traffic from, and forward ATM traffic to, line cards connected to an input/output bus, crosspoint architectures, Banyan and other multistage architectures, and hybrids of these various types.

FIG. 2 schematically illustrates the construction of one of ATM switches 8 according to the present invention. In this example, multiple physical layer interfaces $9_0$ through $9_k$ are provided, each connected to an physical ATM link over which ATM traffic is bidirectionally communicated. These physical links may include metal conductors such as coaxial cable or twisted pair lines, fiber optic facilities, wireless links, and the like. Each of physical layer interfaces 9 is thus specifically realized to provide the interface functionality for its particular physical link. Additionally, each physical link may communicate multiple virtual channels (VCs) of ATM traffic, in time-division multiplexed fashion. Each physical layer interface 9 is associated with a corresponding line interface, or line card, 10. Line cards 10 each perform conventional ATM communications processing, such as buffering and queuing of ATM packets, traffic policing and traffic shaping functions including the determination of whether incoming cells are conforming to the traffic contract (and, conversely, of controlling transmission so as to be conforming), scheduling of traffic and the like.

Each of the multiple line cards $10_0$ through $10_k$ interface with switch fabric 12; as is known in the art, switch fabric 12 performs the actual routing of ATM traffic from the source node to the appropriate destination of switch 8. Relative to FIG. 2, switch fabric 12 effectively routes traffic received at one of physical layer interfaces 8 to the line card 10 (and physical layer interface 9) associated with the destination for that traffic. Control processor 14 is connected to switch fabric 12, and has memory 15 associated therewith; the operation of control processor 14 in carrying out ABR flow control according to the preferred embodiment of the invention will be described hereinbelow. Switch fabric 12 of switch 8 in FIG. 2 is illustrated generically, as its actual architecture can vary quite widely. For example, switch fabric 12 may be implemented as a cross-point switching matrix, or as a multistage Banyan-style switch, in which case switch fabric 12 will be resident circuitry interfacing with line cards 10 as shown. Alternatively, switch fabric 12 may simply represent a backplane-style data bus, with the switching operations carried out by control processor 14 also resident on that bus, or carried out by processors resident on line interfaces 10 themselves. It is contemplated that those of ordinary skill in the art having reference to this specification will be readily able to implement switch 8 according to their desired architecture to include the flow control functionality described hereinbelow, according to any of these architecture styles or any other ATM switch architecture.

Control processor 14 of switch 8 in FIG. 2, according to the preferred embodiment of the invention, is contemplated to be a programmable microprocessor of sufficient processing capability to perform flow control and other traffic management functions, as described hereinbelow, in combination with general control of switch 8 itself. In that regard, control processor 14 may be a general purpose microprocessor, or alternatively may be realized as a digital signal processor (DSP) such as the TMS320c6x class of DSPs available from Texas Instruments Incorporated. The actual capability of control processor 14 will, of course, depend upon the level of functionality required not only by the flow control described herein, but also upon the extent to which control processor 14 itself carries out the switching operations. Memory 15 is preferably random access memory (RAM) for storing parameters relating to the operation of switch 8 and the VCs communicated thereby. According to this preferred embodiment of the invention, memory 15 also refers to read-only memory (ROM) or other fixed storage of program code and the like. As such, memory 15 of FIG. 2 refers, in general, to more than one physical memory type and resource.

As described above relative to the Background of the Invention, closed loop traffic management, particularly in setting the cell rates of Available Bit Rate (ABR) traffic, is accomplished by operation of switches 8, in cooperation with the sources and destinations of ATM traffic over the network. As noted above, fairness in the assignment of cell rates for ABR cells, particularly in the allocation of cell rates for over-subscribed links, is of particular concern in such traffic management. The present invention is directed to the efficient implementation of such a fairness approach, as will now be described in detail relative to its theory of operation.

As described above in the Background of the Invention, the under-subscribed bottleneck rate $BR_U$ of a link may be expressed as equation (7):

$$BR_U = r_1 + \frac{R - \sum_{l=1}^{k} m_l r_l}{m_1} \qquad (7)$$

Accordingly, bottleneck rate $BR_U$ may be determined from the largest cell rate $r_1$ handled by the link, the number $m_1$ of flows having this largest rate $r_1$, and by the sum $$\sum_{l=1}^{k} m_l r_l$$

of the rates of all flows, where k is the number of distinct rates r (i.e., the length of the rate sequence for the link). According to the present invention, it has been observed that the under-subscribed bottleneck rate $BR_U$ may thus be determined without knowledge of the individual rates r other than the largest rate $r_1$. After the under-subscribed case has been identified, and the rates of the flows adjusted to converge to the Max-Min fair rate allocation, the sum $$\sum_{l=1}^{k} m_l r_l$$

converges to R (the ABR bandwidth of the link) and the bottleneck rate BR is thus $r_1$, as flows with lower rates (l>1) are constrained elsewhere in the network.

In the over-subscribed case, however, the bottleneck rate $BR_O$ is specified by equation (3) described above:

$$BR_O = \frac{R - \sum_{l=l^*}^{k} m_l r_l}{N - \sum_{l=l^*}^{k} m_l} \quad (3)$$

According to conventional techniques, as described above, this equation requires knowledge of the entire sequence of rates r to determine l*, which is the level at which inequality (2) is satisfied.

According to the present invention, however, only a subset G of the entire sequence of rates r, along with the entire sum of rates $$\sum_{l=1}^{k} m_l r_l,$$

are stored and used in determination of the over-subscribed bottleneck rate $BR_O$. In those cases where level l*<G+1, the computation of the over-subscribed bottleneck rate $BR_O$ according to equation (3) is not affected, as the sums therein may be determined from the stored rates (and sums), and thus bottleneck rate $BR_O$ may be exactly calculated. However, in those cases where level l* at which inequality (2) is satisfied is below the stored subset (i.e., l*>G+1), the lack of stored rates $r_l$ requires the approximation that l*=G+1 to compute the over-subscribed bottleneck rate $BR_O$ (as no additional rate information is available). This, effectively, results in the assumption that all flows having a rate $r_l<r_G$ are constrained elsewhere in the network. Accuracy in the setting of flow rates in the first instance is thus somewhat dependent upon the accuracy of this assumption; however, the computational cost of deriving bottleneck rate $BR_O$ is reduced to on the order of G (i.e., O(G)).

According to the preferred embodiment of the invention, subset G is reduced to the highest rate $r_1$, such that G=1, effectively assuming that l*=2, and that therefore flows that have anything below the highest rate $r_1$ are constrained elsewhere in the network. Based upon this assumption, a bottleneck rate BR' for a link may be readily derived, by modifying equation (3), as follows:

$$BR' = \frac{R - \sum_{l=2}^{k} m_l r_l}{N - \sum_{l=2}^{k} m_l} = r_1 + \frac{R - \sum_{l=1}^{k} m_l r_l}{m_1} \quad (8)$$

According to the preferred embodiment of the invention, if the second largest rate $r_2$ is less than the actual bottleneck rate BR, in the lock condition, estimated bottleneck rate BR' from equation (8) will return the exact bottleneck rate BR. However, it has been observed in connection with the present invention that often the second largest rate, and others in the sequence, actually exceed the exact bottleneck rate BR. This causes the sources of flows with these rates that are above the estimated bottleneck rate BR', and also above the true bottleneck rate BR, to reduce their rates $r_{l>2}$ more than is necessary when estimated bottleneck rate BR' is used directly.

The preferred embodiment of the invention, however, reduces this overcorrection by recognizing that the ratio R/N of total ABR bandwidth R to the total number of ABR flows N handled by the link is a lower bound on the true bottleneck rate BR. In other words, the bottleneck rate BR exactly equals R/N when all flows are constrained by the link under consideration, while the true bottleneck rate BR is necessarily greater than the ratio R/N when one or more flows are constrained elsewhere. According to the preferred embodiment of the invention, therefore, an estimated bottleneck rate BR" for an over-subscribed link may be determined from:

$$BR'' = \max\left(\frac{R}{N}, r_1 + \frac{R - \sum_{l=1}^{k} m_l r_l}{m_1}\right) \quad (9)$$

The second argument in the max function of equation (9) is identical to the under-subscribed bottleneck rate $BR_U$ of equation (7), for the actual or assumed case of l*=2. However, it is readily observed, according to the present invention, that the under-subscribed bottleneck rate $BR_U$ of equation (7) is always greater than the ratio R/N (or, at least, is equal to this ratio). According to the preferred embodiment of the invention, therefore, using subset G=1, one may readily determine the bottleneck rate BR as follows:

$$BR = \max\left(\frac{R}{N}, r_1 + \frac{R - \sum_{l=1}^{k} m_l r_l}{m_1}\right) \quad (10)$$

The quantity $r_1$, as noted above, is simply the largest rate, while the quantity $$\frac{R - \sum_{l=1}^{k} m_l r_l}{m_1}$$

is the surplus bandwidth of the link, divided equally among the flows $m_1$ with the largest rate $r_1$. It has been observed, by way of simulation of the preferred embodiment of the invention described hereinbelow, that ABR sources managed according to this assumption will converge, after slight oscillation over a few measurement intervals, to cell rates that exactly match those derived according to a full Max-Min rate allocation.

To the extent that oscillation is present in this convergence, such oscillation is due to two reasons. In the case of an over-subscribed link, the assumption of G=1 as in equation (10) will return a bottleneck rate BR that will not only reduce the rate of the largest rate $r_1$ by an amount necessary to end the over-subscription, but will also reduce some of the lower rates $r_{l>2}$, causing a larger than required reduction in utilization of the link. Conversely, in the under-subscribed case, the bottleneck rate BR may be larger than necessary. These errors in estimation of the bottleneck rate BR according to the present invention may cause transient oscillation in the link utilization.

However, it is contemplated, and has been observed through simulation, that convergence is rapidly attained according to the present invention. Firstly, as noted above, this approach correctly determines the bottleneck rate at a lock condition of l*=2, which is the case where all but the largest rate flows are constrained at links other than the current link under consideration, and the bottleneck rate BR is larger than the second largest rate. This situation is intuitively correct, as all flows that are not constrained by the current link thus receive a fair, equally-divided, share of the available bit rate. Secondly, in the event that the link under consideration is under-subscribed or over-subscribed, the determination of the bottleneck rate BR causes the flows to appropriately increase or decrease their rates, respectively, providing negative feedback to the system. Additionally, stability in the network is maintained even in the case where a given link over-estimates its bottleneck rate BR, because this error does not affect the determination of the bottleneck rates BR at links having lower bottleneck levels; furthermore, because of the lower bound on the bottleneck rate set by the ratio R/N, lowest bottleneck links cannot underestimate their bottleneck rates, and as such higher level bottleneck links will necessarily determine their bottleneck rates. Accordingly, it is contemplated that, according to the preferred embodiment of the invention, persistent oscillations will not occur, and fairness in cell rate assignment will be reached.

Figure 3:
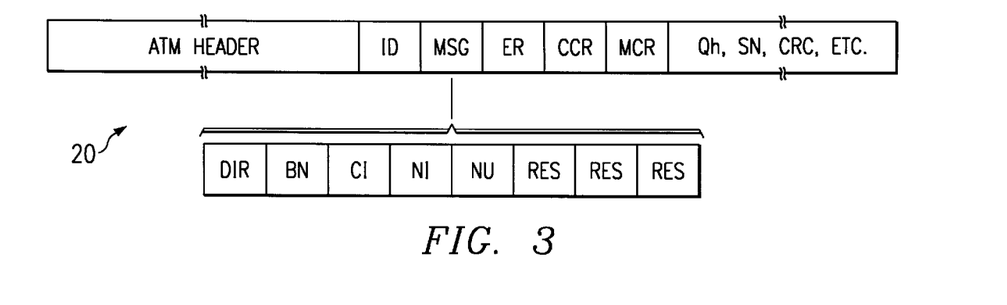
FIG. 3 is a schematic illustration of an arrangement of a Resource Management ATM cell as utilized in connection with the preferred embodiment of the present invention.

Referring now to FIG. 3, the definition of a resource management (RM) cell as utilized in connection with the preferred embodiment of the invention will now be described. As is known in the art, RM cells may be forward-traveling (from source to destination) or backward-traveling (from destination or from a switch to the source); the backward-traveling RM cells provide feedback to the source to adjust cell rates and to effect other control. According to the preferred embodiment of the invention, invitations to increase cell rate and requests to decrease cell rate are generated by switch 8, and communicated to the source of ATM traffic by way of such backward-traveling RM cells.

FIG. 3 illustrates RM cell 20 for an ATM traffic flow, or virtual channel (VC), specifically an RM cell as used in the management of an ABR flow, and arranged according to the preferred embodiment of the invention. RM cell 20 of FIG. 3 is a 53 byte packet, consistent with the ATM protocol. Unlike ATM data cells, which include 45 bytes of payload in combination with an eight-byte header, RM cell 20, as is typical for conventional RM cells, consists entirely of control information. The control information included within RM cell 20 includes information forwarded by the source of the ATM VC when RM cell 20 is forward-traveling, and includes feedback and control information generated by an ATM switch such as switch 8 or by the destination of the ATM VC, when RM cell 20 is backward traveling.

In the example of FIG. 3, RM cell 20 includes an ATM header, typically within the first six bytes, which includes the appropriate ATM header information specified by the appropriate ATM specification. Byte ID, which follows the ATM header, includes a protocol identifier to identify the service class with which RM cell 20 is associated; in the current specification, an identifier ID value of 1 indicates ABR service.

Byte MSG corresponds to a message type field, and includes bits that are set or not set, depending upon the type of message being conveyed by RM cell 20. As shown in FIG. 3, and as specified in the current ATM specification, bit DIR indicates the direction of data flow associated with the RM cell (i.e., forward or backward-traveling). Bit BN indicates, when set, that the current instance of RM cell 20 is a Backward Explicit Congestion Notification cell, as known in the art. Bit CI, when set by a network element, indicates that congestion is present in the network, in response to which (if the current instance of RM cell 20 is backward-traveling) the ATM source will reduce its Allowed Cell Rate (ACR) which, as known in the art, is the current rate at which the source allows itself to send ATM traffic. Bit NI indicates, when set and when present in a backward-traveling RM cell 20, that the source is not to increase its ACR; however, but NI does not necessarily request a cell rate decrease. Bit AR is not used in ABR traffic, nor are the reserved bits RES.

Referring back to the body of RM cell 20 in FIG. 3, field ER is a two-byte field in which an explicit cell rate is communicated. For forward-traveling RM cell 20, field ER will contain an explicit cell rate that is less than the Peak Cell Rate (PCR) for the flow; for backward-traveling RM cells 20, field ER is a cell rate that switch 8 or another network element effecting traffic management uses to specify, to the ATM source, the desired cell rate for the associated flow. The lowest ER field received by the source will thus define the constraint rate of the associated VC. Field CCR communicates the current cell rate of the flow (and as such is included in forward-traveling cells only), while field MCR communicates the minimum cell rate for the associated flow. According to conventional ATM protocol, these rates are communicated in a binary floating point representation, as a number of cells per second. The remainder of RM cell 20 includes additional control information as is conventional in the ATM art, including queue length, sequence number, and CRC error-correction information.

Figure 4:
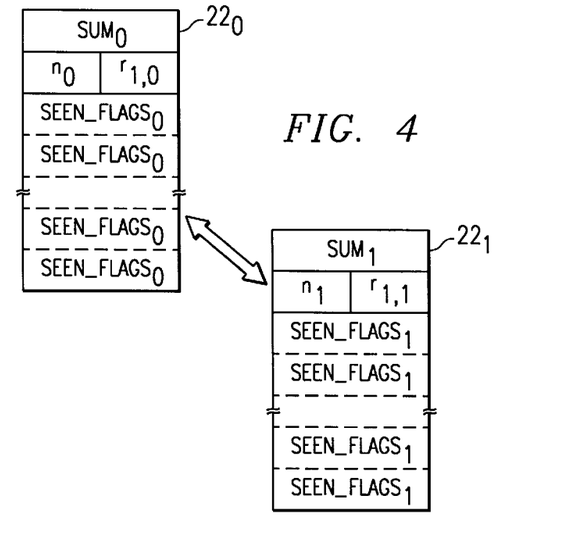
FIG. 4 is a memory map, illustrating multiple arrays of the memory of the ATM switch as utilized in connection with the preferred embodiment of the present invention.

Referring now to FIG. 4, memory 15 of switch 8 of FIG. 2 includes, for each link, a pair of arrays $22_0$, $22_1$ that store parameters used by control processor 14 in effecting flow control process according to the preferred embodiment of the invention. As noted above, switch 8 interfaces with multiple ATM links, by way of line cards 10 and physical layer interfaces 9, and as such memory 15 will include multiple pairs of such arrays 22 within its address space. It is contemplated, of course, that those of ordinary skill in the art will be readily able to incorporate the necessary number of links into memory 15, as may be handled by switch 8. Of course, memory 15 of switch 8 will also be used for storage of many other parameters related to operation of switch 8, including as necessary for effecting traffic management operations. Furthermore, given that arrays 22 are associated with the flows handled by specific links, it is contemplated that arrays 22 may be resident within memory resources implemented in line interfaces 10, in which case each line interface 10 will contain the array associated with the flows communicated through its respective link. The location of arrays 22 thus depend upon the particular switch architecture, as noted above.

Referring back to FIG. 4, array $22_0$ includes a field $SUM_0$ for storing a numerical value corresponding to the sum $$\sum_{l=1}^{k} m_l r_l$$

of the rates of all flows handled by switch 8 for a given link L. Array $22_0$ also includes a field $r_{1,0}$ for storing the highest cell rate $r_1$ of the flows communicated through link L, and also a field $m_{1,0}$ for storing the number of flows $m_1$ that are operating at this highest cell rate $r_1$. Array $22_0$ further includes fields $SEEN\_FLAGS_0$ which store a flag SEEN for each of the flows being handled by link L. Array $22_1$ similarly includes fields $SUM_1$, $r_{1,1}$, and $m_{1,1}$, along with fields $SEEN\_FLAGS_1$, also associated with link L. The duplicate arrays $22_0$, $22_1$ are included in memory 15 according to this preferred embodiment of the invention, to permit the updating of the fields SUM, $r_1$, $m_1$ during the same measurement period in which changes in cell rates are communicated to the ATM sources based on the most recently calculated bottleneck rate. In other words, one of arrays 22 will be in the process of being updated while the other one of arrays 22 is used to generate the new bottleneck rate and request or invite changes in cell rates from the sources. This dual array approach minimizes overall computational time required for performing the traffic management process of the present invention.

Figure 5:
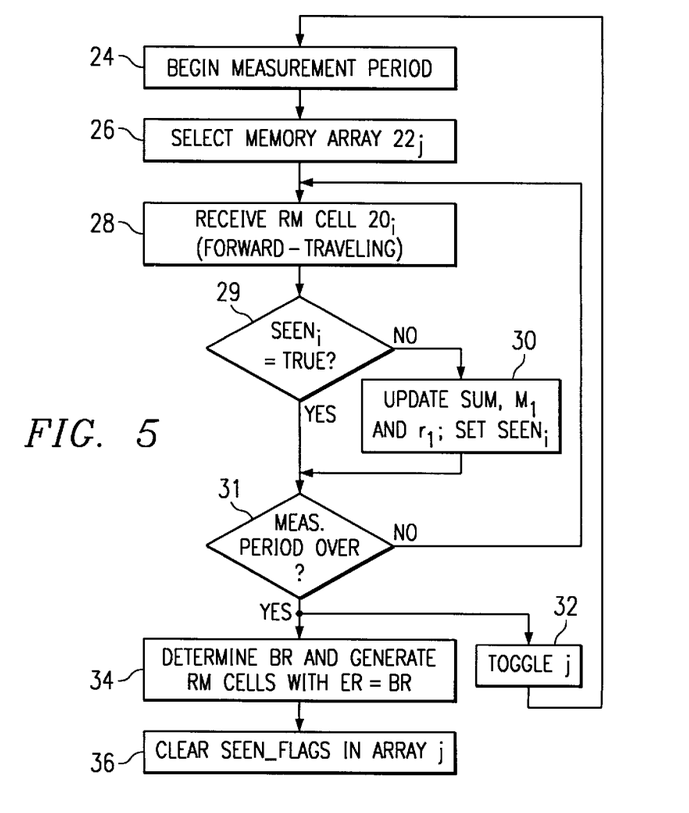
FIG. 5 is a flow chart, illustrating the operation of the ATM switch of FIG. 2 according to the preferred embodiment of the present invention.

Referring now to FIG. 5, the operation of switch 8 in performing the traffic management function according to the preferred embodiment of the present invention is described in detail. The operations illustrated in FIG. 5 are performed for a given link L which, of course, is only one of many links being handled by switch 8, and as such the procedure of FIG. 5 may be performed either in parallel or sequentially with a similar procedure for the other links in the network. In any case, the procedure according to the preferred embodiment of the invention is a distributed approach, in that each link is able to determine its own bottleneck rate BR based upon the flows that it carries, without requiring knowledge of the bottleneck rates and constraint rates of other links and flows in the network. It is contemplated, based on the example of FIG. 2 described hereinabove, that control processor 14 of switch 8 will be readily capable of performing the traffic management procedure according to the preferred embodiment of the invention, and as such the following description will make reference to actions taken by control processor 14. Of course, as noted above, different processing hardware may alternatively be utilized to perform these functions, with the location of such hardware dependent upon the particular switch architecture.

The operation of switch 8 according to this preferred embodiment of the invention begins, in process 24, with the initiation of a measurement period. The measurement period that commences in process 24 is preferably selected to correspond to a time that permits each flow, or VC, handled by link L to have communicated at least one RM cell 20; as will become apparent from the following description, the bottleneck rate calculation will be erroneous if rates from each of the flows are not considered. Of course, the measurement period cannot be so long as to render the traffic management function non-responsive. It is contemplated that those of ordinary skill in the art will be able to select an appropriate measurement period, given the traffic levels and expected rates of RM communication for the network, and using some amount of statistical design. In process 26, control processor 14 selects one of the two arrays $22_0$, $22_1$ for updating during the measurement period that commenced with process 24, with such selection made in response to an index j that toggles between 0 and 1. For purposes of this description, the exemplary operation will be described with index j having an initial value of 0. At this point in the process, all of the SEEN flags in array $22_0$ are clear.

In process 28, switch 8 detects the arrival of a forward-traveling RM cell $20_i$, generated by the source of ATM traffic for a particular flow $F_i$. As described above relative to FIG. 3, RM cell $20_i$ includes information relative to the current cell rate (CCR) for flow $F_i$, as well as other parameters relating to the ABR class of traffic. Control processor 14 next, in decision 29, interrogates flag $SEEN_i$ in the appropriate field $SEEN\_FLAGS_0$ of array $22_0$, to determine the state of this flag. If an RM cell $20_i$ has already been received for flow $F_i$ in the current measurement period, its flag $SEEN_i$ in array $22_0$ will have been set (i.e., decision 29 is YES), and control will pass to decision 31. However, if flag $SEEN_i$ of array $22_0$ is not set, no RM cell $20_i$ for flow $F_i$ has yet been received during the current measurement period, and decision 29 returns a NO. Control then passes to process 30, in which control processor 14 updates fields SUM, $r_{1,0}$, and $m_{1,0}$ in array $22_0$, as will now be described.

In process 30, control processor 14 interrogates the current cell rate (CCR) field of RM cell $20_i$ to determine whether the cell rate in this field is greater than or equal to the highest cell rate received in the current measurement period. If so, highest rate field $r_{1,0}$ is set to equal the CCR from RM cell $20_i$ (if not already at this cell rate from another flow of equal CCR), and the value of field $m_{1,0}$ is set to the value one (as flow $F_i$ is the first flow having this highest rate). If the CCR field of RM cell $20_i$ equals the current value of highest rate field $r_{1,0}$ the value of field $m_{1,0}$ is incremented, advancing the count of those flows having the highest rate. Whether or not the CCR of RM cell $20_i$ is the highest cell rate yet measured in this period, field $SUM_0$ is updated by adding the CCR of RM cell $20_i$ thereto. Finally, flag $SEEN_i$ is set by control processor 14, in field $SEEN\_FLAGS_0$ of array $22_0$, completing process 30. Control then passes to decision 31.

In decision 31, control processor 14 determines whether the current measurement period has expired. If not (decision 31 is NO), control passes back to process 28 to await the arrival of the next RM cell 20 for one of the flows handled by link L, from which point the process repeats.

Upon the expiry of the current measurement period (decision 31 is YES), two parallel actions are carried out by control processor 14. One of these actions passes control to process 32, in which the array index j is toggled to the other state (in this example, to j=1). Control then passes back to process 24, in which the measurement period again commences, and array $22_1$ (in this example) is used to again update fields SUM, $r_1$, and $m_1$. In parallel with the new measurement period, the values of $SUM_0$, $r_1$, and $m_1$ stored in array $22_0$ are used to determine the next value of the bottleneck rate for link L.

As described above, the bottleneck rate BR of link L according to the preferred embodiment of the invention is calculated, in process 34, by control processor 14 executing instructions corresponding to equation (10):

$$BR = \max\left(\frac{R}{N}, r_1 + \frac{R - \sum_{l=1}^{k} m_l r_l}{m_1}\right) \quad (10)$$

These calculations are performed, in this example where array $22_0$ was most recently updated, by control processor 14 executing, in process 34, arithmetic instructions upon the corresponding fields in array $22_0$ as follows:

$$BR = \max\left(\frac{R}{N}, r_{1,0} + \frac{R - SUM_0}{m_{1,0}}\right) \quad (11)$$

where total bandwidth R and the total number of flows N are known values for link L, either selected a upon or, in the case of flows N, counted during update processes 28, 30. This bottleneck rate BR, once calculated, can be used to set explicit rate field ER in backward-traveling RM cells generated by, or traveling through, switch 8 for each flow handled by link L, and communicated to the respective source of the ATM traffic for those flows. According to this embodiment of the invention, bottleneck rate BR is preferably an upper bound upon the value communicated by field ER, such that if field ER is set to bottleneck rate BR if its current value is greater than bottleneck rate BR, but is not modified if its current value is less than bottleneck rate BR (as the flow is constrained elsewhere). For flows that are constrained by link L, the explicit cell rate ER field in these backward-traveling RM cells generated by switch 8 will serve to modify the current cell rate CCR field for the flows, and thus provide feedback regarding the available bandwidth of link L thereto.

As is evident from the foregoing, the flow control method according to this preferred embodiment of the invention effectively determines the bottleneck rate BR by allowing flows to increase their cell rates, or asking flows to decrease their cell rates, over a sequence of measurement periods. If the bottleneck rate BR for a link is greater than the Peak Cell Rate (PCR) of one or more flows communicated by the link, once the PCR for a flow is exceeded by the largest rate ri, the flow is considered to be constrained by another link in the network (i.e., by the source, through its setting of the PCR). As a result, the PCR limits specified in the traffic contract for each flow are taken into consideration by the flow control method according to the preferred embodiment of the invention.

Referring back to FIG. 5, following process 34, control processor 36 then performs process 36 to clear all flags SEEN in fields SEEN_FLAGS$_0$ of array $22_0$, in this example. Process 36 thus prepares array $22_0$ for the next measurement period, during which array $22_i$ will be used in process 34 to generate the next value of bottleneck rate BR, and during which array $22_0$ will again be updated with values for fields SUM, $r_1$, and $m_1$.

According to the preferred embodiment of the invention, therefore, an efficient method and ATM switch is provided by way of which flow control for the ABR service class of ATM communications may be effected. The computational cost of performing the flow control operation is on the order of O(1), as only the single rate calculation of process 34 is performed. Updating of the arrays of flags SEEN, as well as the incremental updating of the fields SUM, $r_1$, $m_1$, require on the order of N operations, but the use of two arrays 22 to permit updating of one array 22 while the other array 22 is in use for generating the bottleneck rate and RM cells greatly reduces the computational cost of this approach, such that this flow control can be readily carried out in real-time, without disrupting communications. Furthermore, the preferred embodiment of the invention does not require storage of individual cell rates for each of the flows handled by each of the links, as the fields SUM, $r_1$, $m_1$ may be incrementally updated upon the receipt of forward-traveling RM cells according to the present invention. It is therefore contemplated that the present invention will be quite beneficial when applied to ATM traffic management operations, such as carried out in ATM switches and other network elements.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of allocating data rates among a plurality of available bit rate message flows, at a communications link in a network, the link having an available bit rate bandwidth associated with available bit rate traffic, the method comprising the steps of:

receiving a resource management cell from each of the plurality of message flows, the resource management cell including a current cell rate value;

identifying a highest current cell rate value from the resource management cells associated with the plurality of message flows;

identifying the number of flows having the highest current cell rate value;

determining a surplus bandwidth value for the link;

calculating a first bottleneck rate by adding the highest current cell rate value to the surplus bandwidth value;

generating a bottleneck rate corresponding to the larger of the first bottleneck rate and a ratio of the available bit rate bandwidth to the number of available bit rate message flows in the plurality of available bit rate message flows; and communicating backward-traveling resource management cells to sources of each of the plurality of available bit rate message flows, each of the backward-traveling resource management cells having an explicit rate value no higher than the bottleneck rate.

2. The method of claim 1, wherein the step of determining a surplus bandwidth value comprises:

identifying the number of flows having the highest current cell rate value;

adding the current cell rates of the plurality of message flows to produce a rate sum;

subtracting the rate sum from the available bit rate bandwidth of the link; and dividing the result of the subtracting step by the number of flows having the highest data rate.

3. The method of claim 2, further comprising:

initializing a first array of flags in a memory, each of the plurality of flags corresponding to one of the plurality of available bit rate message flows;

after the receiving step for one of the resource management cells, and responsive to the flag associated with the corresponding one of the plurality of available bit rate message flows not being set, then setting the associated flag and performing the identifying and determining steps; and responsive to the flag associated with the corresponding one of the plurality of available bit rate message flows being set, not performing the identifying and determining steps.

4. The method of claim 3, wherein the receiving, identifying, and determining steps are performed over a measurement period; and further comprising:

after expiration of the measurement period, resetting the first array of flags.

5. The method of claim 4, wherein the setting step is performed relative to the first array over a first instance of the measurement period;

wherein the resetting step is performed after expiration of the first instance of the measurement period; further comprising:

initializing a second array of flags in a memory, each of the plurality of flags corresponding to one of the plurality of available bit rate message flows;

then performing the receiving, setting, identifying, and determining steps over a second instance of the measurement period, wherein the setting step is performed relative to the second array over the second instance of the measurement period; and after expiration of the second instance of the measurement period, resetting the second array of flags.

6. The method of claim 5, wherein the step of resetting the first array of flags is performed during the second instance of the measurement period.

7. The method of claim 2, wherein the step of determining a surplus bandwidth value is performed after receiving each resource management cell, and comprises the steps of:

comparing the current cell rate value of the received resource management cell with the highest current cell rate value and, responsive to the current cell rate value of the received resource management cell being higher than the highest current cell rate value, replacing the highest current cell rate value with the current cell rate value of the received resource management cell and setting, to the value one, a counter for storing a value corresponding to the number of flows having the highest current cell rate value;

responsive to the current cell rate value of the received resource management cell being equal to the highest current cell rate value, incrementing the value stored in the counter; and adding the current cell rate value to a current value of the rate sum.

8. A switch for routing cell-based communications received at one of a plurality of links, comprising:

a plurality of physical layer interfaces, each associated to and interfacing with one of the plurality of links;

a plurality of line interfaces, each coupled to one of the plurality of physical layer interfaces;

switch fabric, coupled to the plurality of line interfaces, for routing communications thereamong; and a control processor, for allocating data rates among a plurality of available bit rate message flows received over the plurality of links, wherein each of the plurality of links has an available bit rate bandwidth associated with available bit rate traffic, by performing a sequence of operations, for each link, comprising the steps of:

responsive to the line interface receiving a resource management cell from the plurality of message flows, identifying a highest current cell rate value from the resource management cells associated with the plurality of message flows;

identifying the number of flows having the highest current cell rate value;

determining a surplus bandwidth value for the link;

calculating a first bottleneck rate by adding the highest current cell rate value to the surplus bandwidth value;

generating a bottleneck rate corresponding to the larger of the first bottleneck rate and a ratio of the available bit rate bandwidth to the number of available bit rate message flows in the plurality of available bit rate message flows; and controlling the line interface associated with the link to communicate backward-traveling resource management cells to sources of each of the plurality of available bit rate message flows, each of the backward traveling resource management cells having an explicit rate value no higher than the bottleneck rate.

9. The switch of claim 8, wherein the control processor is programmed to determine the surplus bandwidth value for the link by performing the operations of:

identifying the number of flows having the highest current cell rate value;

adding the current cell rates of the plurality of message flows to produce a rate sum;

subtracting the rate sum from the available bit rate bandwidth of the link; and dividing the result of the subtracting step by the number of flows having the highest data rate.

10. The switch of claim 8, further comprising:

a memory, coupled to the control processor, and arranged as a plurality of pairs of arrays, each array pair associated with one of the plurality of links, each array in the pair including a plurality of flags, each flag associated with one of the plurality of message flows communicated by its associated link;

and wherein the control processor is programmed to perform the identifying and determining steps for each link over first and second measurement periods, and wherein the sequence of operations further comprises:

initializing the plurality of flags in the first array;

responsive to receiving one of the resource management cells in the first measurement period, and responsive to the flag in the first array associated with the corresponding one of the plurality of available bit rate message flows not being set, then setting the associated flag and performing the identifying and determining steps;

responsive to the flag in the first array associated with the corresponding one of the plurality of available bit rate message flows being set, not performing the identifying and determining steps; and after expiration of the first measurement period, resetting the plurality of flags in the first array;

initializing the plurality of flags in the second array;

responsive to receiving one of the resource management cells in the second measurement period, and responsive to the flag in the second array associated with the corresponding one of the plurality of available bit rate message flows not being set, then setting the associated flag and performing the identifying and determining steps;

responsive to the flag in the second array associated with the corresponding one of the plurality of available bit rate message flows being set, not performing the identifying and determining steps; and after expiration of the second measurement period, resetting the plurality of flags in the second array.

11. The switch of claim 10, wherein the control processor resets the flags in the first array during the second measurement period.

* * * * *